(12) United States Patent
Menke et al.

(10) Patent No.: US 7,947,178 B2
(45) Date of Patent: May 24, 2011

(54) METHOD AND APPARATUS FOR THE ANAEROBIC TREATMENT OF WASTE WATER

(75) Inventors: Lucas Menke, Munich (DE); George Troubounis, Munich (DE)

(73) Assignee: Meri Entsorgungstechnik fuer die Papierindustrie GmbH, Munich (DE)

( * ) Notice: Subject to any disclaimer, the term of this patent is extended or adjusted under 35 U.S.C. 154(b) by 69 days.

(21) Appl. No.: 12/293,077

(22) PCT Filed: Mar. 14, 2007

(86) PCT No.: PCT/EP2007/002252
§ 371 (c)(1),
(2), (4) Date: Jan. 23, 2009

(87) PCT Pub. No.: WO2007/104551
PCT Pub. Date: Sep. 20, 2007

(65) Prior Publication Data
US 2009/0294355 A1    Dec. 3, 2009

(30) Foreign Application Priority Data

Mar. 15, 2006  (DE) .................. 10 2006 011 951
Dec. 20, 2006  (DE) .................. 10 2006 060 428

(51) Int. Cl.
*C02F 3/28* (2006.01)

(52) U.S. Cl. ........ 210/603; 210/631; 210/259; 210/206; 210/221.2; 435/262.5

(58) Field of Classification Search .................. 210/603, 210/631, 252, 259, 198.1, 205, 206, 221.1, 210/221.2, 928; 435/262, 262.5
See application file for complete search history.

(56) References Cited

U.S. PATENT DOCUMENTS
4,849,108 A  *  7/1989  de Wilde et al. .............. 210/603
(Continued)

FOREIGN PATENT DOCUMENTS
DE  31 06 422 A1  9/1982
(Continued)

OTHER PUBLICATIONS

C. Buelow, et al., "SchlieBung des Wasserkreislaufs einer Altpapier verarbeitenden Papierfabrik unter besonderer Beruecksichtigung der Calcium-Problematik," Das Papier, (2003), pp. 31-38, http://www.ipwonline.de/download/zellchem/2003/dp010301.pdf.

(Continued)

*Primary Examiner* — Fred Prince
(74) *Attorney, Agent, or Firm* — Kilpatrick Townsend & Stockton LLP; J. Georg Seka

(57) ABSTRACT

The present invention relates to a process for the purification of waste water, in particular for the continuous purification of waste water in papermaking, where waste water to be purified is fed to an anaerobic reactor (12), the waste water is contacted, in the anaerobic reactor (12), with anaerobic microorganisms in order to degrade contaminants present in the waste water, and the purified waste water is discharged from the anaerobic reactor (12), where at least some of the waste water is subjected to a pressure-release flotation step (30) before being supplied to the anaerobic reactor or after being discharged from the anaerobic reactor, in order to delime the water to at least some extent. Furthermore, the present invention relates to a device which is suitable for carrying out the process according to the invention.

25 Claims, 5 Drawing Sheets

U.S. PATENT DOCUMENTS

Figure 1:
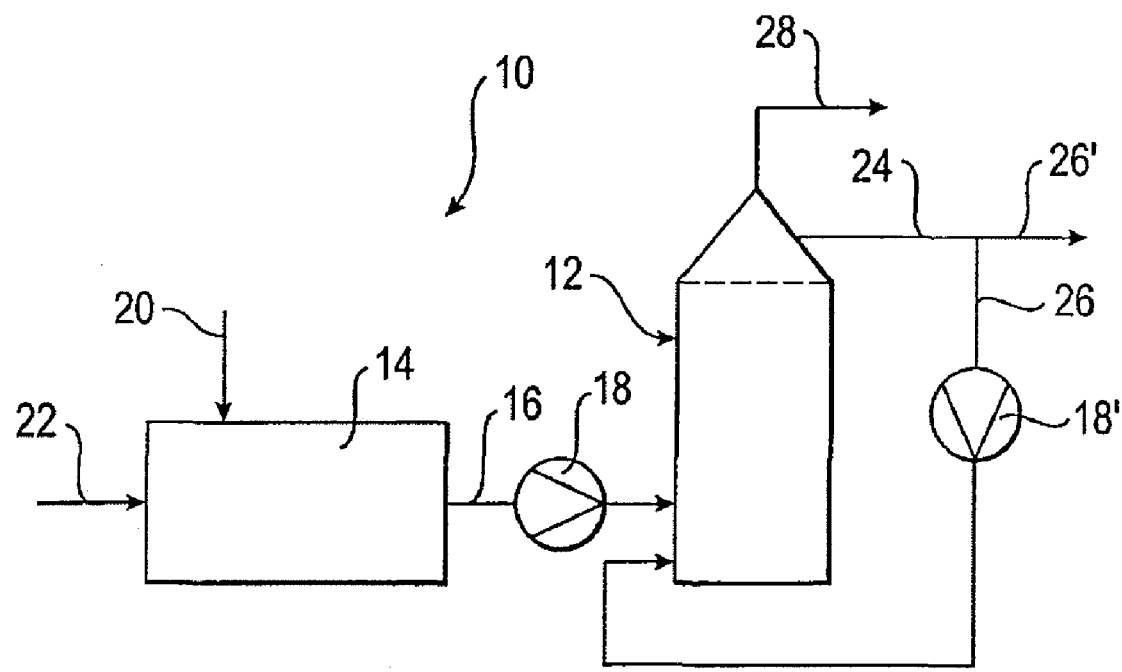

| | | | |
|---|---|---|---|
| 6,372,139 B1* | 4/2002 | Habets et al. | 210/605 |
| 7,081,364 B1 | 7/2006 | Haarer et al. | |
| 2008/0053900 A1* | 3/2008 | Shafer et al. | 210/631 |
| 2008/0099396 A1 | 5/2008 | Rother et al. | |

FOREIGN PATENT DOCUMENTS

| | | |
|---|---|---|
| DE | 43 31 927 A1 | 3/1994 |
| DE | 198 45 808 C1 | 7/2000 |
| DE | 10 2004 047 010 A1 | 3/2006 |
| EP | 0 170 332 A1 | 2/1986 |
| EP | 0 231 762 A2 | 8/1987 |
| EP | 0 494 399 A1 | 7/1992 |
| EP | 0 539 430 B1 | 10/1994 |
| EP | 1 071 636 B1 | 1/2001 |
| EP | 1 097 908 A1 | 5/2001 |
| JP | 54 019550 A | 2/1979 |
| JP | 2002-145226 A | 5/2002 |
| WO | WO 92/20628 A1 | 11/1992 |

OTHER PUBLICATIONS

B. Bobek, et al., "*Anaerobe Behandlung von Abwaessern der Papierindustrie mit thermophilen Mikroorganismen,*" Das Papier, (Jul. 2005), pp. 50-57, http://www.ipwonline.de.

* cited by examiner

METHOD AND APPARATUS FOR THE ANAEROBIC TREATMENT OF WASTE WATER

CROSS-REFERENCE TO RELATED APPLICATIONS

This application is a National Stage of International Application No. PCT/EP2007/002252, filed Mar. 14, 2007, and which claims the benefit of German Patent Application No. 10 2006 011 951.7, filed Mar. 15, 2006, the disclosures of both applications being incorporated herein by reference.

The present invention relates to a method for the purification of waste water, in particular for the continuous purification of waste water in the paper making industry, wherein waste water to be purified is supplied to an anaerobic reactor, the waste water is contacted with anaerobic microorganisms in the anaerobic reactor to break down contaminants contained in the waste water and the purified waste water is drained out of the anaerobic reactor. The present invention furthermore relates to an apparatus suitable for the carrying out of the method in accordance with the invention.

A plurality of mechanical, chemical and biological processes and corresponding reactors are known for waste water purification. In biological waste water purification, the waste water to be purified is contacted with aerobic or anaerobic microorganisms which break down the organic contaminants contained in the waste water predominantly to carbon dioxide and water in the case of aerobic microorganisms and predominantly to carbon dioxide and methane in the case of anaerobic microorganisms. In this respect, the biological waste water purification processes are increasingly carried out with anaerobic microorganisms in the recent past because in an anaerobic waste water purification oxygen does not have to be introduced into the bioreactor under a high energy effort, on the one hand, and high-energy biogas is generated in the purification, on the other hand, which can subsequently be used to gain energy. Depending on the type of biomass used, the reactors for the anaerobic waste water purification are divided into contact sludge reactors, UASB reactors, EGSB reactors, fixed bed reactors and fluidized bed reactors. Whereas the microorganisms in fixed bed reactors adhere to stationary carrier materials and the microorganisms in fluidized bed reactors adhere to freely movable small carrier material, the microorganisms in the UASB and EGSB reactors are used in the form of so-called pellets.

In the UASB and EGSB reactors, waste water to be purified is supplied continuously to the reactor via an inflow in the lower reaction region and is guided through a sludge bed located above the inflow and containing microorganism pellets. On the breaking down of the organic compounds from the waste water, the microorganisms in particular form gas which contains methane and carbon dioxide, and which is in particular also called biogas, of which some accumulates at the microorganism pellets in the form of small bubbles and of which some rises upwardly in the reactor in the form of free gas bubbles. The specific weight of the pellets falls due to the accumulated gas bubbles so that the pellets rise upwardly in the reactor. To separate the biogas formed and the rising pellets from the water, separators are arranged in the middle and/or upper part of the reactor, usually in the form of gas hoods under whose crown biogas collects which forms a gas cushion under which a flotation layer of microorganism pellets and waste water is located. Purified water freed of gas and microorganism pellets rises upwardly in the reactor and is drained off via overflows at the upper end of the reactor, whereas the microorganism pellets freed of the gas bubbles sink downwardly in the reactor again due to the now increased specific weight. Such processes and corresponding reactors are described, for example, in EP 0 170 332 A1, in EP 1 071 636 B1 and in EP 0 539 430 B1.

It is also known to supply the waste water to be purified to a preacidification reactor, in which an enzymatic hydrolysis and acidogenesis take place, before being supplied to an anaerobic reactor. Whereas polymers such as polysaccharides, polypeptides and fats are broken down to their monomers such as sugar, amino acids and fatty acids during enzymatic hydrolysis by exoenzymes originating from microorganisms, these monomers are converted in the acidogenesis into organic acids, alcohols, aldehydes, hydrogen and carbon dioxide by acidogenic microorganisms. Consequently, a first pre-purification already takes place in the preacidification reactor. In addition, the growth conditions suitable for the anaerobic microorganisms used in the subsequent anaerobic reactor can be set in the preacidification reactor by addition of suitable nutrients and trace elements. For example, the waste water occurring in the paper making industry as a rule only has very few nitrogen compounds and phosphorous compounds so that they have to be added to the waste water before its delivery to the anaerobic reactor to ensure an ideal growth of the microorganisms in the anaerobic reactor. Equally, the pH values of the waste water to be purified suitable for the growth of the microorganisms in the subsequent anaerobic reactor can be set in the preacidification reactor by addition of corresponding pH setting media.

A major problem in the purification of waste water in an anaerobic reactor is the water hardness of the waste water or the carbonates and hydrogen carbonates contained in the waste water. As already presented in the above, microorganism pellets are used in anaerobic reactors, or they are formed during the operation of the reactor, said microorganism pellets representing crystallization nuclei for lime scale due to their structure and size. Lime scale of this type on the microorganism pellets, however, impairs their function. As presented above, it is important for the function of anaerobic reactors that the microorganism pellets have a defined specific weight to be able to rise upwardly in the reactor during the breaking down of the organic compounds from the waste water by the formed biogas which adheres to the microorganism pellets to separate the biogas formed at the gas separator. After separation of the biogas, the specific weight may in particular not become so large that the microorganism pellets sink down to the bottom of the reactor since they can otherwise no longer take part in the purification process. Any lime deposition on the microorganism pellets, however, leads to an incalculable shift of the specific weight, which can have the result that the microorganism pellets can no longer exercise their function. The metabolic activity of the anaerobic microorganisms also effects a shift in the lime/carbon dioxide balance due to the generation of hydrogen carbonate ions ($HCO_3$) among other things, which further promotes a lime precipitation onto the microorganism pellets. In order to ensure the function of the microorganism pellets despite the lime precipitation thereon, the recirculation amounts in the anaerobic reactor would have to be increased to keep the pellets in suspension in the reactor despite their larger specific weight. However, the recirculation amount is subject to limits by the hydraulic capacity of the separators, on the one hand, and by the necessity of keeping the flow in the reactor laminar, on the other hand. Higher recirculation amounts moreover cause the escape of carbon dioxide and thereby a further shift of the lime/carbon dioxide balance in the direction of lime precipitation due to the arising of pressure gradients at the suction and pressure side of the pump in the recirculation line.

To overcome this problem it has been proposed, for example in the publication "anaerobe Behandlung von Abwässern der Papierindustrie mit thermophilen Mikroorganismen" [Anaerobic treatment of waste waters of the paper making industry using thermophilic microorganisms] by Bobek et al. in IPW 7/2005, to supply fouling inhibitors to the anaerobic reactor. These fouling inhibitors, however, have the result that the inorganic proportion of the microorganism pellets increases further. In addition, due to the delivery of the fouling inhibitors, substantial additional costs arise in the operation of the anaerobic reactors.

Another known solution of this problem comprises removing the carbon dioxide in an aerobic reactor after, i.e. downstream of, the anaerobic reactor. However, the precipitated lime sludge in the aerobic stage can impair the function of the aeration units by clogging, which is in turn associated with increased costs.

It is therefore the object of the present invention to provide a simple and cost-effective method as well as a corresponding apparatus for the purification of waste water, in particular for the purification of waste water in the paper making industry, wherein the contaminants contained in the waste water can be efficiently broken down in an anaerobic reactor while avoiding the aforesaid problems.

This object is satisfied in accordance with the invention by a method in accordance with claim 1 and in particular by a method for the purification of waste water, in particular for the continuous purification of waste water in the paper making industry, wherein waste water to be purified is supplied to an anaerobic reactor, the waste water is contacted with anaerobic microorganisms in the anaerobic reactor to break down contaminants contained in the waste water, and the purified waste water is drained out of the anaerobic reactor, with at least some of the waste water being subjected to a pressure relief flotation (a dissolved air flotation) step for the purpose of at least partial deliming before the delivery into the anaerobic reactor or after the draining out of the anaerobic reactor.

Since the waste water to be purified is subjected to a dissolved air flotation step either before the delivery into the anaerobic reactor or after the draining from the anaerobic reactor, the water hardness of the waste water can be reduced by precipitation of lime so that a lime precipitation disturbing the function of the microorganism pellets can be reliably prevented in the anaerobic reactor. A further particular advantage of the method in accordance with the invention comprises the dissolved air flotation step being able to be carried out at least partly in a microflotation device which is frequently provided for coarse clarification in the apparatus for waste water purification known in the prior art and including an anaerobic reactor so that only slight modifications are required to already existing systems for the carrying out of the method in accordance with the invention.

At least partial deliming is to be understood in the sense of the present invention as the reduction of the water hardness.

in the method in accordance with the invention, at least some of the waste water is preferably subjected to a dissolved air flotation step for the purpose of at least partial deliming before the delivery to the anaerobic reactor or is subjected to a dissolved air flotation step after the draining out of the anaerobic reactor and is subsequently guided at least partly back into the anaerobic reactor.

In the dissolved air flotation step, the waste water is preferably set to a neutral or alkaline pH, is dosed with gas and is pressurized before the waste water treated in this way is exposed to a reduced pressure. Whereas a precipitation of lime is achieved by the setting of a neutral or alkaline pH, the subsequent addition of pressurized gas, pressurization and following exposure to a pressure or expansion which is reduced with respect to the pressurization effects the bubbling out of small gas bubbles in the waste water mixture, with the individual gas bubbles flowing upwardly due to the mixing and in so doing take along the precipitated lime flocs which can thus easily be separated from the waste water.

To achieve an efficient lime precipitation in the dissolved air flotation step, it is proposed in a further development of the idea of the invention to set the waste water to a pH between 7 and 10, preferably between 7 and 9 and particularly preferably between 7.5 and 8.5. Suitable pH setting media for the setting of the pH into the aforesaid ranges include, for example sodium hydroxide solution (NaOH), potassium hydroxide solution (KOH) and calcium hydroxide ($Ca(OH)_2$). The setting of the pH can naturally also take place in all other ways known to the person of ordinary skill in the art; for example, in that a chemical compound such as urea is catalytically, e.g. enzymatically, converted to a base compound such as ammonia.

To support the lime precipitation and to be able to separate the lime flocs formed in the dissolved air flotation step particularly easily from the waste water, it has proved to be advantageous to add at least one precipitant and/or at lest one flocculation aid to the waste water before or during the dissolved air flotation step. Whereas the precipitant facilitates the lime precipitation, the flocculation aid effects the formation of lime flocs with a structure and size desired for a simple separation thereof.

Whereas polyaluminum chloride has proven itself as a precipitant, a preferred example for a suitable flocculation aid is polyacrylamide.

Generally, the dissolved air flotation step can take place before or after the delivery of the supplied waste water to the anaerobic reactor, i.e. the waste water to be purified can be supplied to a dissolved air flotation device before the delivery to the anaerobic reactor (upstream process management), before it is drained out of the dissolved air flotation device and is supplied directly or indirectly to the anaerobic reactor or the waste water to be purified can first be supplied to the anaerobic reactor (downstream process management) before the waste water drained out of the anaerobic reactor is supplied to a dissolved air flotation device. It has proved to be particularly advantageous within the framework of the present invention to supply the waste water to a dissolved air flotation device before the delivery to the anaerobic reactor because the dissolved air flotation device can then be combined with a microflotation device present for the separation of particular material in existing systems.

It is proposed in a further development of the idea of the invention furthermore to provide a preacidification step in the method in accordance with the invention in which the waste water is subjected to hydrolysis and/or acidogenesis in a preacidification reactor. A pre-purification of the waste water supplied to the anaerobic reactor is thus already achieved. In this embodiment of the present invention, the waste water can be supplied (back) to the anaerobic reactor and/or (back) to the preacidification reactor after the dissolved air flotation step.

In the method in accordance with the invention, the temperature of the waste water, in particular the temperature of the waste water supplied to the anaerobic reactor, is preferably regulated and/or monitored to set the ideal temperature for the microorganisms contained in the anaerobic reactor.

In accordance with a preferred embodiment for the downstream—with respect to the anaerobic purification step—carrying out of the dissolved air flotation step, provision is made to supply the waste water to be purified continuously to a dissolved air flotation device in which the dissolved air flotation step takes place and to mix it there with at least some of the waste water continuously drained out of the anaerobic reactor and to drain at least partially delimed waste water continuously from the dissolved air flotation device which is guided into a preacidification reactor as well as from there continuously into the anaerobic reactor.

Alternatively to this, it is also possible to supply the waste water to be purified continuously to a dissolved air flotation device in which the dissolved air flotation step takes place and to mix it there with at least some of the waste water continuously drained out of the anaerobic reactor and to drain at least partly delimed water continuously from the dissolved air flotation device which is guided continuously into the anaerobic reactor. It is furthermore also possible to separate the at least partly delimed waste water continuously drained out of the dissolved air flotation device into two part flows and to guide one part flow (back) into the anaerobic reactor and the other part flow (back) into the preacidification reactor and/or to drain at least some of it from the apparatus and to reuse it in a production process.

In accordance with a preferred embodiment for the downstream, with respect to the anaerobic purification step, carrying out of the dissolved air flotation step, provision is made for the waste water to be purified to be supplied continuously to a preacidification reactor as well as to guide it from there into the anaerobic reactor, to drain purified waste water continuously from the anaerobic reactor at least some of which is guided into a dissolved air flotation device in which the dissolved air flotation step takes place and to drain waste water continuously from the dissolved air flotation device which is guided back into the preacidification reactor and/or into the anaerobic reactor.

It is proposed in a further development of the idea of the invention to separate the purified waste water continuously drained out of the anaerobic reactor into two part flows of which one is drained out of the apparatus, with the other part flow being guided into the dissolved air flotation device.

In the last-named embodiment, it has proved to be advantageous that the part flow supplied to the dissolved air flotation device amounts, with respect to the total flow drained out of the anaerobic reactor, to between 5 and 80%, and particularly preferably to between 30 and 50%.

The process management preferably takes place such that the water hardness in the dissolved air flotation step is reduced by at least 5%, particularly preferably by at least 20% and very particularly preferably by at least 40%.

A further subject of the preset invention is an apparatus for the purification of waste water which is in particular suitable for the carrying out of the previously described method in accordance with the invention.

In accordance with the invention, the apparatus includes at least one reactor for the anaerobic purification of waste water having at least one supply line for the delivery of waste water to be purified into the reactor as well as having at least one drain line for the draining of purified waste water from the reactor, with the apparatus furthermore including a dissolved air flotation device having a dissolved air flotation reactor, said dissolved air flotation device being connected to the at least one drain line of the anaerobic reactor via a dissolved air flotation supply line such that at least a part flow of the purified waste water drained out of the anaerobic reactor via the drain line can be guided into the dissolved air flotation reactor, with the dissolved air flotation device having at least one supply line for a pH setting medium and the dissolved air flotation device furthermore including a return line leading from the dissolved air flotation reactor directly or indirectly to the anaerobic reactor, preferably a liquid return line for the at least part return of waste water. In this respect, the dissolved air flotation device can be connected to the at least one drain line of the anaerobic reactor via a dissolved air flotation supply line such that at least a part flow of the purified waste water drained out of the anaerobic reactor via the drain line is guided directly or indirectly, i.e. via further apparatus parts, into the dissolved air flotation reactor.

The apparatus preferably has a waste water supply line which is arranged downstream of the anaerobic reactor and is connected in a liquid conducting manner to a dissolved air flotation supply line or to the dissolved air flotation reactor.

It is furthermore preferred for the dissolved air flotation device to have at least one supply line for a precipitant and/or a flocculation aid.

It is proposed in a further development of the idea of the invention to provide at least one supply line for a pressurized gas in the dissolved air flotation device.

In accordance with a further preferred embodiment of the present invention, the dissolved air flotation device has a gas solution device which is connected to the dissolved air flotation reactor via a line and into which the pressurized gas supply line opens.

In addition, it has proved to be expedient for the waste water supply line to open in to a mixer unit and to open from there via a supply line into the dissolved air flotation reactor, with the mixer unit preferably having a supply line for pH setting media and/or a supply line for precipitants and/or flocculation aids.

To achieve a pre-purification of the waste water, the apparatus furthermore preferably has a preacidification device which is preferably provided upstream of the anaerobic reactor.

It is proposed in a further development of the idea of the invention to connect the preacidification device in its inflow region to a return line of the dissolved air flotation device and in its outflow region to the supply line of the anaerobic reactor.

Alternatively to this, it is also possible to allow a return line of the dissolved air flotation device to open directly or via a mixer device arranged in the line between the preacidification device and the anaerobic reactor into the inflow region of the anaerobic reactor.

In accordance with a further preferred embodiment of the present invention, provision is made for the apparatus to have a waste water supply line which is arranged upstream of the anaerobic reactor and is connected in a fluid conducting manner to the supply line of the anaerobic reactor.

In particular with the aforesaid embodiment, the apparatus can furthermore also have a preacidification device, with the preacidification device being connected at its inflow region to the waste water supply line and at its outflow region to the supply line of the anaerobic reactor, with the return line of the dissolved air flotation device being able to be connected to the inflow region of the preacidification device and/or to the inflow region of the anaerobic reactor.

To set a temperature which is in particular ideal for the microorganisms contained in the anaerobic reactor, the apparatus preferably has a temperature setting device which is preferably arranged in the return line. The temperature setting device is preferably a heat exchanger or a cooling device, for example a cooling tower.

The anaerobic reactor preferably has a reactor tank in whose lower region the supply line to the anaerobic reactor is provided, at least one inflow distributor for the mixing of the waste water supplied to the reactor with the medium located in the reactor, at least one overflow arranged at the upper reactor tank for the draining of purified water to the reactor drain line as well as at least one separator. In addition, the anaerobic reactor can have a down line which is preferably arranged concentrically around the longitudinal axis of the reactor.

The present invention will be described in the following purely by way of example with reference to advantageous embodiments and to the enclosed drawings.

Figure 2:
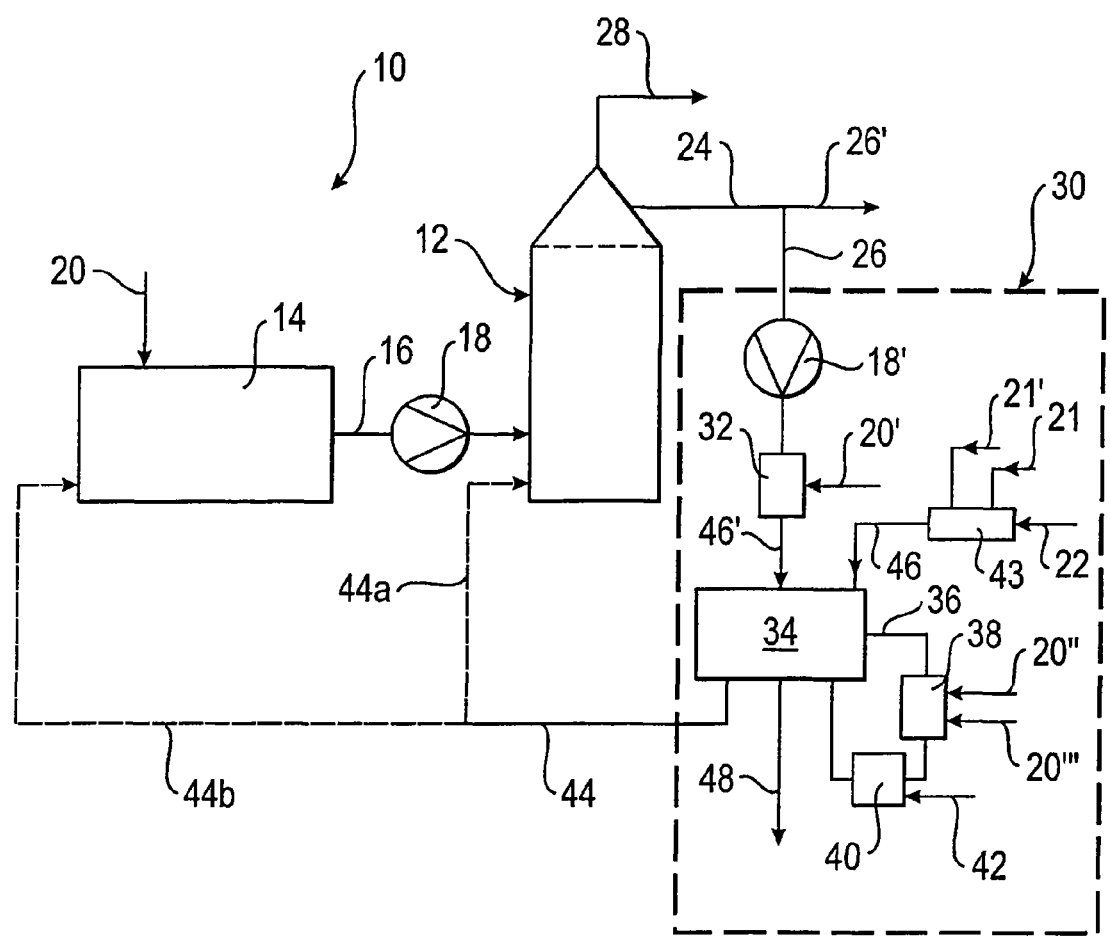
Figure 3:
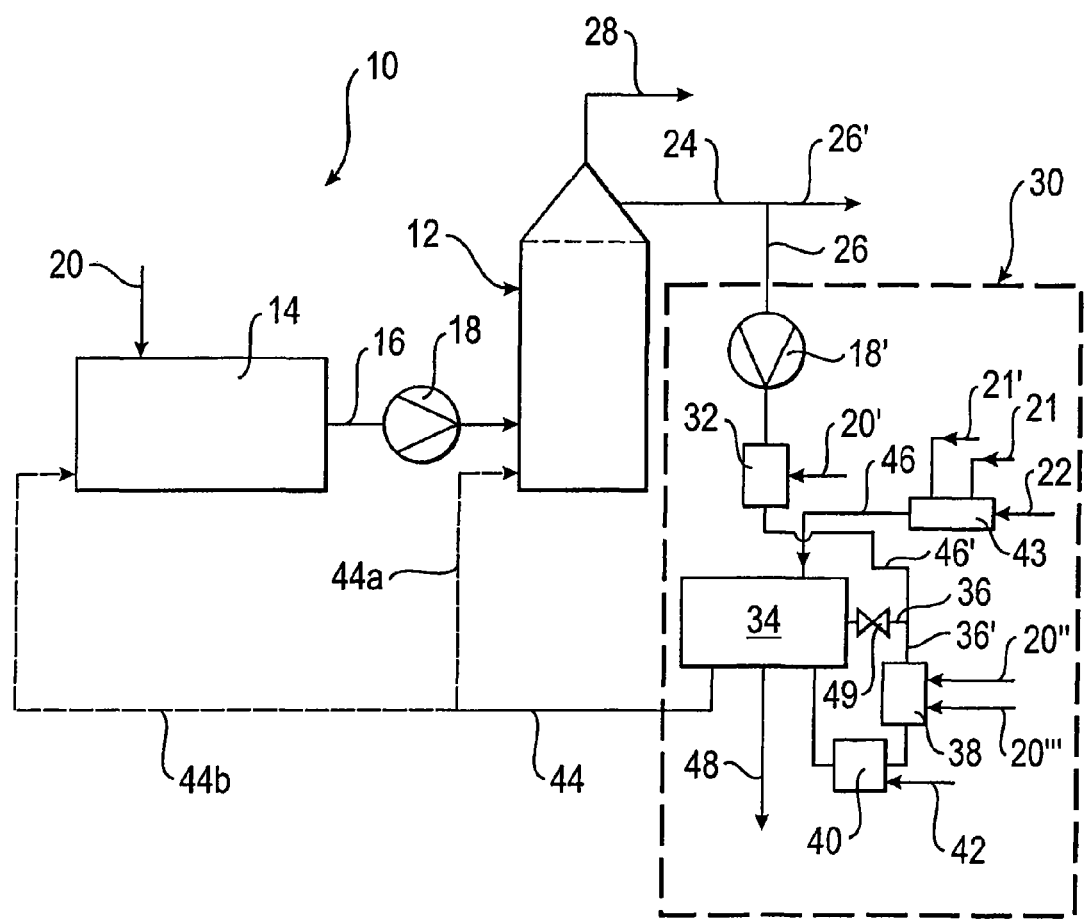
Figure 4:
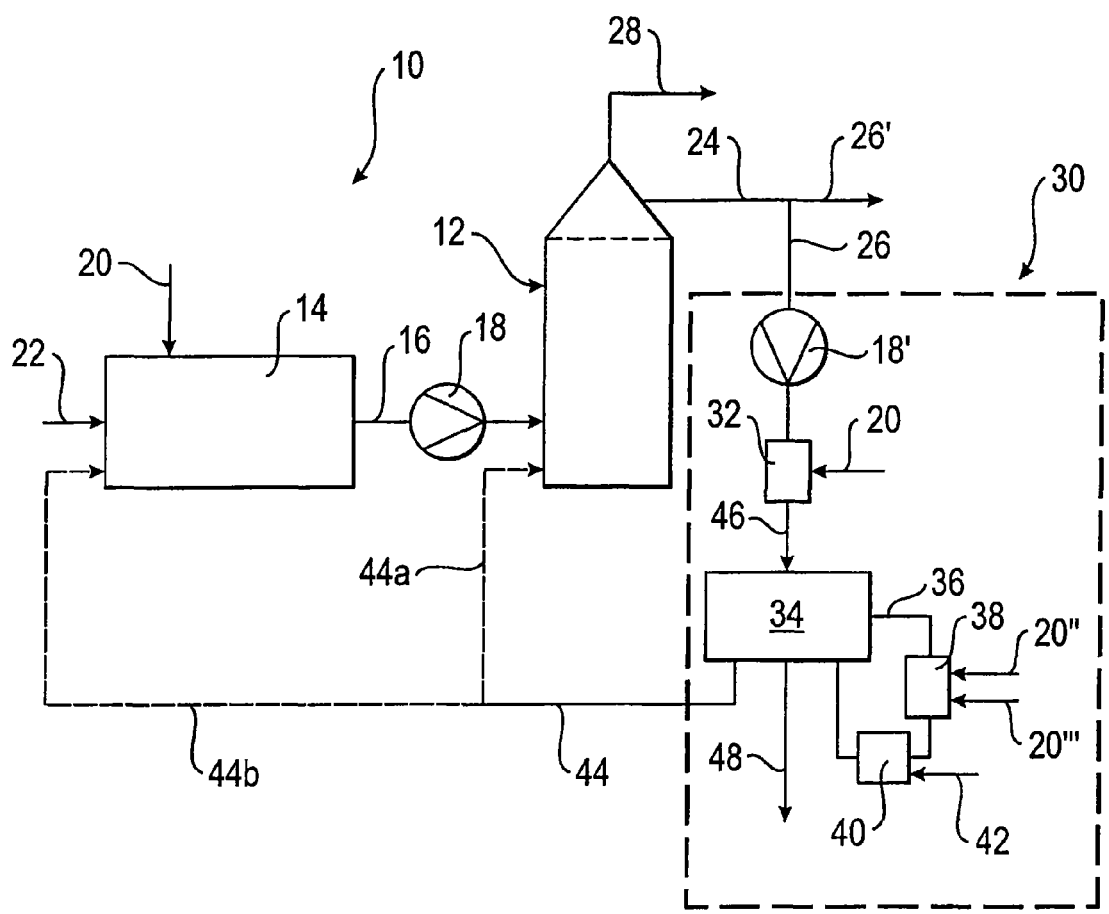
Figure 5:
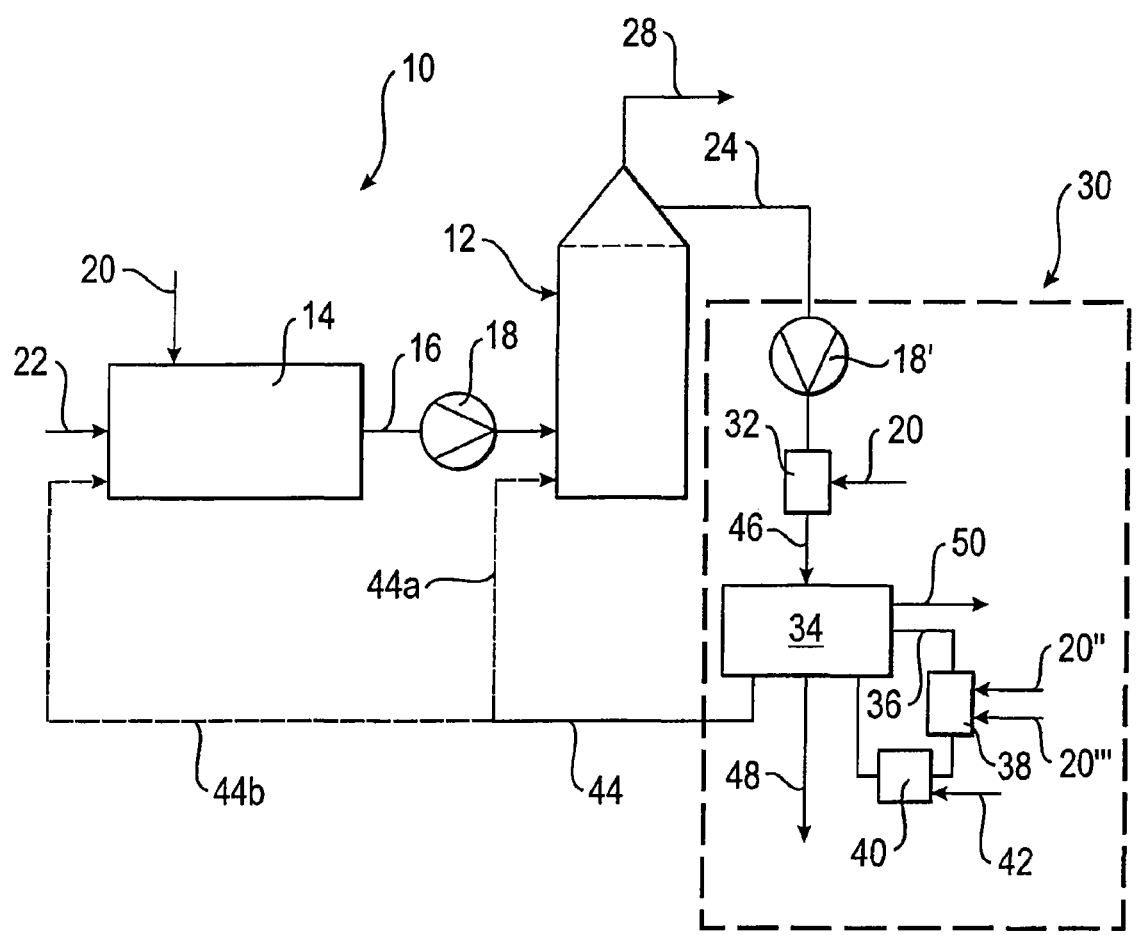

There are shown:

FIG. 1 a schematic view of an apparatus for the purification of waste water in the paper making industry in accordance with the prior art;

FIG. 2 a schematic view of an apparatus for the purification of waste water in the paper making industry in accordance with a first embodiment of the present invention;

FIG. 3 a schematic view of an apparatus for the purification of waste water in the paper making industry in accordance with a second embodiment of the present invention;

FIG. 4 a schematic view of an apparatus for the purification of waste water in the paper making industry in accordance with a third embodiment of the present invention; and FIG. 5 a schematic view of an apparatus for the purification of waste water in the paper making industry in accordance with a fourth embodiment of the present invention.

The apparatus shown in FIG. 1 for the purification of waste water in accordance with the prior art includes an anaerobic reactor 12 as well as a preacidification device 14. The preacidification device 14 is connected before the anaerobic reactor 12 and is connected to it via a supply line 16 and a pump 18. The preacidification device 14 furthermore has an inflow line 20 for pH setting media, nutrients, trace elements and the like as well as a waste water supply line 22 for the delivery of the waste water to be purified into the preacidification device 14. In addition, the apparatus 10 includes an anaerobic drain line 24 via which the waste water purified in the anaerobic reactor 12 is drained out of the reactor 12. Two part flow drain lines 26, 26', from which the part flow line 26 returns via the pump 18' to the inflow region of the anaerobic reactor 12, branch out of the drain line 24, whereas a part flow of the purified waste water is drained from the apparatus 10 via the part flow line 26'. Finally, the anaerobic reactor 12 has a gas drain line 28 for the draining of the biogas formed in the anaerobic reactor 12.

In the operation of the apparatus 10, the waste water to be purified, which originates from a paper making factory, for example, is first guided via the waste water supply line 22 to the preacidification device 14 in which it is set by the additives and auxiliary materials such as pH setting media, nutrients and/or trace elements supplied via the inflow line 20 to conditions suitable for the downstream anaerobic reactor 12 among which the microorganisms contained in the reactor are metabologically active. Alkaline or alkaline earth metal hydroxide solutions such as sodium hydroxide solution are used as pH setting media, whereas urea and potassium hydrogen phosphate are examples for suitable nutrients and trace elements. In addition, a partial decomposition of the contaminants takes place in the preacidification device 14 by enzymatic hydrolysis and acidogenesis. After the waste water in the preacidification device 14 has been mixed with the additives and auxiliary materials, it is pumped into the anaerobic reactor 12 via the supply line 16 by means of the pump 18.

In the anaerobic reactor 12, the introduced waste water is first mixed with the medium located in the reactor 12 via an inflow distributor (not shown) in the lower region of the reactor 12 and is guided through a sludge bed (not shown) located above the inflow and containing microorganism pellets, with the anaerobic microorganisms located in the reactor 12 breaking down the organic contaminants contained in the waste water predominantly to carbon dioxide and methane. The biogas which is formed on the breaking down of the organic compounds and in particular includes methane and carbon dioxide accumulates partly in the form of small bubbles at the microorganism pellets and rises upwardly in the reactor partly in the form of free gas bubbles. The specific weight of the pellets falls due to the accumulated gas bubbles so that the pellets rise upwardly in the reactor. To separate the biogas formed and the rising pellets from the water, separators (not shown) are arranged in the middle and/or upper part of the reactor, usually in the form of gas hoods under whose crown the biogas collects which forms a gas cushion under which a flotation layer of microorganism pellets and waste water is located. Purified water freed of gas and microorganism pellets rises upwardly in the reactor and is drained at the upper end of the reactor via the drain line 24, whereas the biogas formed leaves the anaerobic reactor 12 via the gas drain line 28.

A part flow is drained from the purified waste water continuously drained during the operation of the apparatus 10 from the anaerobic reactor 12 via the drain line 24 via the part flow line 26' from the apparatus 10, whereas the other part flow is guided back via the part flow line 26 into the inflow region of the anaerobic reactor 12. Due to the metabolic activity of the anaerobic microorganisms, a shift of the lime/carbonic acid balance occurs in the anaerobic reactor 12, whereby a lime precipitation occurs on the microorganism pellets acting as crystallization nuclei, which has a negative influence on their functional capability.

Unlike the apparatus 10 in accordance with the prior art shown in FIG. 1, the apparatus 10 for the purification of waste water shown in FIG. 2 has a dissolved air flotation device 30 shown bordered by dashed lines in FIG. 2 beside the anaerobic reactor 12 and the preacidification device 14. In addition, the waste water to be purified is not supplied to the apparatus 10 via a waste water supply line leading to the preacidification device 14, but via a waste water line 22 leading into the dissolved air flotation device 30.

The dissolved air flotation device 30 includes a pH setting device 32 to which a substance, for example sodium hydroxide solution, suitable for the setting of the pH of the waste water supplied via the part flow line 26 from the anaerobic reactor 12 to the dissolved air flotation device can be supplied via an inflow line 20'. In addition, the dissolved air flotation device 30 includes a dissolved air flotation reactor 34 in which lime is separated from the waste water by means of dissolved water flotation. For this purpose, the dissolved air flotation reactor 34 has a circuit line 36 which is connected to a mixing in unit 38 and to a gas solution reactor 40. Precipitants and/or flocculation aids can be added to the mixing in unit 38 via the inflow line 20", 20''', whereas the gas solution reactor 40 is equipped with a pressurized gas supply line 42.

The waste water supply line 22 leads into a mixer unit 43 into which inflow lines 21, 21' likewise open via which pH setting means, precipitants and/or flocculation aids can be added to the waste water to be purified in the mixer unit 43. The waste water to be purified supplied to the apparatus 10 moves from the mixer unit 43 via the inflow line 46 into the dissolved air flotation reactor 34.

A return line 44 in which a cooling device (not shown) can optionally be provided is provided in the outflow region of the dissolved air flotation reactor and either leads in accordance with a first variant of this embodiment as a return line 44a into the inflow region of the anaerobic reactor 12 or as a return line 44b into the inflow region of the preacidification reactor 14. It is also equally possible to provide both a return line 44a and a return line 44b so that some of the purified delimed water guided back via the line 44 is guided via the return line 44a into the inflow region of the anaerobic reactor 12 and the remaining portion of the purified delimed waste water guided back via the line 44 is guided via the return line 44b into the inflow region of the preacidification reactor 14. The return line 44a can also lead, instead of as shown directly into the anaerobic reactor 12, into a mixer device, not shown here, which can be provided between the preacidification reactor 14 and the anaerobic reactor 12 in the line 16, in particular before the pump 18.

In the operation of the apparatus 10 shown in FIG. 2, the waste water to be purified is led continuously via the waste water inflow line 22 into the mixer unit 43 in which it is mixed with pH setting means, precipitants and flocculation aids supplied to the mixer unit 43 via the inflow lines 21, 21' so that conditions suitable for a lime precipitation from the waste water are set, with the set pH preferably amounting to between 7.5 and 8.5. The waste water treated in this manner is guided continuously via the inflow line 46 from the mixer unit 43 into the dissolved air flotation reactor 34. In addition, a part flow of the purified waste water continuously drained from the anaerobic reactor 12 via the line 34 is guided via the part flow line 26 into the pH setting device 32 in which the waste water to be purified is mixed with the pH setting media supplied to the pH setting device 32 via the inflow line 20' and is set to conditions suitable for lime precipitation. The portion of the part flow supplied to the pH setting device 32 via the part flow line 26 preferably amounts, with respect to the total flow taken out of the anaerobic reactor 12 via the drain line 24, to 5 to 80% and particularly preferably to 30 to 50%. It is furthermore preferred for the pH of this part flow to be set by the addition of the pH setting medium, preferably sodium hydroxide solution, to 7.5 to 8.5. The concentration of sodium hydroxide solution after the addition of the pH setting medium can, for example, amount, with respect to a 50% by weight solution, to 0.2 to 0.6 l/m$^3$. Subsequently the mixture thus generated is guided via a dissolved air flotation supply line 46' into the dissolved air flotation reactor 34.

Some of the liquid located in the dissolved air flotation reactor 34 is removed from the dissolved air flotation reactor 34 continuously via the circuit line 36 and this part flow is guided through the mixing in unit 38 and the gas solution reactor 40 before the part flow is again guided back into the dissolved air flotation reactor 34. Precipitants and flocculation aids which support the precipitation of lime and the formation of lime flocs suitably dimensioned for a separation from the waste water are mixed into the part flow in the mixing in unit 38 via the inflow lines 20", 20'". Polyaluminum chloride can, for example, be used as the precipitant, whereas polyacrylamide is an example for a suitable flocculation aid. A pressurized gas, for example air or another gas containing oxygen or also a gas free of oxygen is added via the pressurized gas supply line 42 to the part flow in the gas solution reactor 40 provided downstream of the mixing in unit 38 for the purpose of preparation for the subsequent dissolved air flotation and the part flow mixed with the pressurized gas is pressurized before the part flow thus treated is guided back into the dissolved air flotation reactor 34. In the dissolved air flotation reactor 34, the pressurized mixture mixed with gas expands abruptly so that the gas present in dissolved form in the water bubbles out and rises upwardly in the form of gas bubbles in the dissolved air flotation reactor 34. At the same time, the lime located in the water forms flocs of suitable size and structure due to the precipitants and flocculation aids present so that they are driven to the water surface in the dissolved air flotation reactor 34 by the upwardly rising gas bubbles. While the lime sludge thus formed is removed from the dissolved air flotation reactor 34 via the sludge drain line 48, the purified water freed from lime is guided, depending on the method variant, via the return line 44a directly or via the above-mentioned mixer device into the inflow region of the anaerobic reactor 12 and/or via the return line 44b into the inflow region of the preacidification reactor 14. Due to the precipitation and separation of the lime from the waste water supplied to the apparatus 10 via the waste water supply line 22 and due to the precipitation and separation of the lime from the part flow supplied to the dissolved air flotation device 30 and originating from the anaerobic reactor 12 in the dissolved air flotation device 30, the water hardness of the waste water supplied to the anaerobic reactor 12 via the inflow line 16 and, optionally, the return line 44a is reduced to a suitably low value such that no amounts of lime are separated in the anaerobic reactor 12 which disturb the function of the microorganism pellets so that the purification efficiency of the anaerobic reactor 12 is optimized.

Since the waste water to be purified and supplied to the apparatus 10 via the waste water supply line 22 is first guided into the dissolved air flotation device 30 before it is guided into the anaerobic reactor 12 disposed downstream of the dissolved air flotation device 30, a microflotation device as a rule connected before the anaerobic reactor 12 in the apparatus known from the prior art and acting as a device for the separation of particular material can be combined with the dissolved air flotation reactor 34. The costs for the apparatus 10 can thereby be substantially reduced.

In the apparatus shown in FIG. 2, two inflow lines 20' 21 for pH setting media are provided from which the inflow line 20' opens into the part flow supplied via the part flow line 26 from the anaerobic reactor via the pH setting device 32 and the inflow line 21 opens via the mixer unit 43 into the waste water to be purified supplied via the waste water supply line 22. Instead of this, only one of the inflow lines 20', 21 can also be provided or instead of both lines, one inflow line for pH setting media (not shown) leading directly to the dissolved air flotation reactor 34 can be provided. Equally, the supply line 21' for precipitants and/or flocculation aids leading to the mixer unit 43 can be dispensed with so that the concentration of precipitants and/or flocculation aids takes place solely via the inflow lines 20", 20'".

The apparatus 10 in accordance with a second embodiment of the present invention shown in FIG. 3 differs from that shown in FIG. 2 in that the part flow supplied to the dissolved air flotation device 30 from the anaerobic reactor 12 via the part flow line 26 is not guided directly into the dissolved air flotation reactor 34 after the pH setting device 32, but rather first into the line 36' guided to the mixing in unit 38. In addition, a circuit line 36 is provided which leads from the dissolved air flotation reactor 34 to the line 36' and which is provided with a valve 49 via which the circuit line can be opened or closed. Alternatively to the embodiment shown in FIG. 3, the part flow supplied to the dissolved air flotation device 30 from the anaerobic reactor 12 via the part flow line 26 can also be supplied after the pH setting device 32 via a suction stub of a pressure pump to the gas solution reactor 40.

Unlike the apparatus 10 shown in FIGS. 2 and 3, the waste water supply line 22 in the apparatus 10 shown in FIG. 4 in accordance with a third embodiment of the present invention is not provided downstream, but rather upstream of the anaerobic reactor 12 and opens directly into the preacidification device 14. In the operation of this apparatus, the waste water to be purified is accordingly guided together with the additives and auxiliary materials supplied via the inflow line 20 into the preacidification device 14 in which the waste water is set, on the one hand, to, conditions suitable for the subsequent anaerobic reactor 12 and is subjected, on the other hand, to enzymatic hydrolysis and acidogenesis, with biopolymers contained in the waste water such as polysaccharides, polypeptides and fats being broken down to their monomers as sugar, amino acids and fatty acids in the enzymatic hydrolysis and the monomers being converted by acidogenesic microorganisms in the acidogenesis into organic acids, alcohols, aldehydes, other compounds, carbon dioxide and hydrogen. The waste water pretreated in this manner is subsequently introduced via the supply line 16 into the anaerobic reactor 12 in which the organic contaminants contained in the waste water are converted by the effect of anaerobic microorganisms mainly into carbon dioxide and methane. The purified waste water is thereupon drained out of the anaerobic reactor 12 via the drain line 24 and is separated into two part flows of which the one part flow is drained out of the apparatus 10 via the part flow line 26', whereas the other part flow is guided via the part flow line 26, via the pH setting device 32 and via the dissolved air flotation supply line 46 into the dissolved air flotation reactor 34 where lime is precipitated from the waste water and is separated from the waste water. Finally, the delimed and purified waste water is either guided via the return line 44a into the anaerobic reactor 12 and/or via the return line 44b into the preacidification device 14.

In the last-named variant of the return of the delimed and purified waste water to the preacidification device 14, the quantity ratio of the waste water to be purified supplied to the preacidification device 14 via the waste water supply line 22 to the water returned from the dissolved air flotation device 30 is preferably in a range between 0.5 and 3. The lime content of the water flowing into the anaerobic reactor 12 is reduced by 30 to 60% by this mixing, which prevents the formation of lime accumulations in the interior of the anaerobic reactor 12 and in particular on the microorganism pellets. The lime formation at the pellets in the anaerobic reactor 12 and thus their floating behavior can be influenced and controlled directly by the direct control of the quantity of the delimed water returned via the return line 44b and/or by the setting of the degree of deliming in the dissolved air flotation reactor 34.

In contrast, the first-named variant of the return of the delimed and purified waste water into the inflow region of the anaerobic reactor 12 should preferably be selected when a low-oxygen gas, in particular nitrogen, carbon dioxide or methane, is supplied to the mixing in unit 38 since methane forming bacteria are used in the anaerobic reactor which are strictly anaerobic and cannot tolerate any oxygen. This variant is in particular recommended when the anaerobic reactor 12 should be directly optimized.

The apparatus 10 shown in FIG. 5 differs from that shown in FIG. 4 in that the water flow drained out of the anaerobic reactor 12 via the drain line 24 is completely introduced via the dissolved air flotation supply line 46 into the dissolved air flotation reactor 34; the water flow 24 is accordingly not divided into part flows. In a further difference to the apparatus shown in FIG. 4, a water drain line 50 is provided at the dissolved air flotation reactor 34 in the apparatus 10 shown in FIG. 5 and some of the liquid flow recirculated via the circuit line 36 is drained from the apparatus 10 to dispose of it or to reuse it. This method variant is in particular advantageous when a gas containing oxygen, preferably air, is used in the mixing in unit 38 because a so-called "flash oxidation" of the remainder of the organic material thereby simultaneously takes place in the dissolved air flotation reactor 34.

REFERENCE NUMERAL LIST 10 apparatus for waste water purification
12 anaerobic reactor
14 preacidification device
16 anaerobic reactor supply line
18, 18' pump
20, 20', 20'', 20''' inflow line
21, 21' inflow line
22 waste water supply line
24 anaerobic reactor drain line
26, 26' part flow line
28 gas drain line
30 dissolved air flotation device
32 pH setting device
34 dissolved air flotation reactor
36 (circuit) line
38 mixing in unit
40 gas solution reactor
42 pressurized gas supply line
43 mixer unit
44 return line
44a return line into the anaerobic reactor
44b return line into the preacidification reactor
46, 46' dissolved air flotation supply line
48 sludge/lime drain line
49 valve
50 water drain line

The invention claimed is:

1. A method for the purification of waste water wherein waste water to be purified is supplied to an anaerobic reactor, the waste water is contacted with anaerobic microorganisms in the anaerobic reactor to break down contaminants contained in the waste water and the purified waste water is drained out of the anaerobic reactor,
   wherein at least some of the waste water is subjected to a dissolved air flotation step for the purpose of the at least partial deliming before the delivery into the anaerobic reactor or after the draining from the anaerobic reactor, with the water hardness being reduced by at least 5% in the dissolved air flotation step.

2. A method in accordance with claim 1, wherein at least some of the waste water is subjected to a dissolved air flotation step for the purpose of the at least partial deliming after the draining from the anaerobic reactor and some of it is subsequently guided back into the anaerobic reactor.

3. A method in accordance with claim 1, wherein the waste water is set to a neutral or alkaline pH in the dissolved air flotation step, is dosed with gas and is pressurized before the waste water is exposed to a reduced pressure.

4. A method in accordance with claim 1, wherein the waste water is set in the dissolved air flotation step to a pH between 7 and 10.

5. A method in accordance with claim 1, wherein at least one precipitant and/or at least one flocculation aid is added to the waste water before or during the dissolved air flotation step.

6. A method in accordance with claim 5, wherein the at least one precipitant comprises polyaluminum chloride.

7. A method in accordance with claim 5, wherein the at least one flocculation aid comprises polyacrylamide.

8. A method in accordance with claim 1, wherein the waste water to be purified is supplied to a dissolved air flotation device before the delivery into the anaerobic reactor before it is drained from the dissolved air flotation device and is supplied directly or indirectly to the anaerobic reactor.

9. A method in accordance with claim 1, wherein the waste water to be purified is supplied to the anaerobic reactor before the waste water drained from the anaerobic reactor is supplied to a dissolved air flotation device.

10. A method in accordance with claim 1, further comprising a preacidification step, in which the waste water is subjected to hydrolysis and/or acidogenesis in a preacidification reactor.

11. A method in accordance with claim 1, wherein the waste water is guided after the dissolved air flotation step back into the anaerobic reactor and/or back into the preacidification reactor.

12. A method in accordance with claim 1, wherein the temperature of the waste water supplied to the anaerobic reactor is regulated and/or monitored.

13. A method in accordance with claim 1, wherein the waste water to be purified is continuously supplied to a dissolved air flotation device in which the dissolved air flotation step takes place and is there mixed with at least some of the waste water continuously drained from the anaerobic reactor and at least partially delimed water is drained continuously from the dissolved air flotation device and is guided into a preacidification reactor and also from there continuously into the anaerobic reactor.

14. A method in accordance with claim 13, wherein the purified waste water continuously drained from the anaerobic reactor is separated into a first part flow which is drained from the apparatus, and a second part flow which is guided into the dissolved air flotation device.

15. A method in accordance with claim 14, wherein the part flow supplied to the dissolved air flotation device amounts, to between 5 and 80% of the total flow drained from the anaerobic reactor.

16. A method in accordance with claim 1, wherein the waste water to be purified is continuously supplied to a dissolved air flotation device in which the dissolved air flotation step takes place and is there mixed with at least some of the waste water continuously drained from the anaerobic reactor and at least partially delimed waste water is continuously drained from the dissolved air flotation device and is guided continuously into the anaerobic reactor and/or at least some of it is drained from the apparatus and is reused in a production process.

17. A method in accordance with claim 1, wherein the waste water to be purified is continuously supplied to a preacidification reactor and is also guided from there into the anaerobic reactor, waste water is continuously drained from the anaerobic reactor, at least some of which is guided into a dissolved air flotation device in which the dissolved air flotation step takes place, and waste water is continuously drained from the dissolved air flotation device and is guided back into the preacidification reactor and/or directly, or via a mixer device provided between the preacidification reactor and the anaerobic reactor, into the anaerobic reactor, and/or at least some of it is drained from the apparatus and is reused in a production process.

18. A method in accordance with claim 17, wherein the purified waste water continuously drained from the anaerobic reactor is separated into a first part flow which is drained from the apparatus, and a second part flow which is guided into the dissolved air flotation device.

19. A method in accordance with claim 18, wherein the part flow supplied to the dissolved air flotation device amounts, to between 5 and 80% of the total flow drained from the anaerobic reactor.

20. A method in accordance with claim 1, wherein the water hardness in the dissolved air flotation step is reduced by at least 20%.

21. An apparatus, for the purification of waste water, comprising:

at least one reactor for the anaerobic purification of waste water, comprising at least one supply line for the delivery of waste water to be purified into the reactor and at least one drain line for the draining of purified water from the reactor, a dissolved air flotation device for the purpose of at least partial deliming before the delivery into the anaerobic reactor or after the draining from the anaerobic reactor, with the water hardness being reduced by at least 5% in the dissolved air flotation step, wherein the dissolved air flotation device comprises a dissolved air flotation reactor and which is connected to the at least one drain line of the anaerobic reactor via a dissolved air flotation supply line such that at least a part flow of the purified waste water drained from the anaerobic reactor via the drain line can be guided into the dissolved air flotation reactor, with the dissolved air flotation device comprising:

at least one supply line for a pH setting medium;
a return line leading from the dissolved air flotation reactor directly or indirectly to the anaerobic reactor;
at least one supply line for a pressurized gas;
a gas solution device which is connected to the dissolved air flotation reactor via a line and into which the pressurized gas line opens, wherein the waste water supply line opens into a mixer unit and opens from there via a supply line into the dissolved air flotation reactor, wherein the mixer unit comprises a supply line for pH setting media and/or a supply line for precipitants and/or flocculation aids.

22. An apparatus, for the purification of waste water, comprising:

at least one reactor for the anaerobic purification of waste water comprising at least one supply line for the delivery of waste water to be purified into the reactor and at least one drain line for the draining of purified water from the reactor, a dissolved air flotation device for the purpose of at least partial deliming before the delivery into the anaerobic reactor or after the draining from the anaerobic reactor, with the water hardness being reduced by at least 5% in the dissolved air flotation device, wherein the dissolved air flotation device comprises a dissolved air flotation reactor and which is connected to the at least one drain line of the anaerobic reactor via a dissolved air flotation supply line such that at least a part flow of the purified waste water drained from the anaerobic reactor via the drain line can be guided into the dissolved air flotation reactor, wherein the dissolved air flotation device comprises:

at least one supply line for a pH setting medium;
a return line leading from the dissolved air flotation reactor directly or indirectly to the anaerobic reactor; and
a preacidification device (14) which is provided upstream of the anaerobic reactor, wherein the preacidification device is connected in its inflow region to a return line of the dissolved air flotation device and in its outflow region to the supply line of the anaerobic reactor.

23. An apparatus in accordance with claim 22, wherein a return line of the dissolved air flotation device opens directly, or via a mixer device provided in the line between the preacidification device and the anaerobic reactor, into the inflow region of the anaerobic reactor.

24. An apparatus, for the purification of waste water, comprising:

at least one reactor for the anaerobic purification of waste water comprising at least one supply line for the delivery of waste water to be purified into the reactor and at least one drain line for the draining of purified water from the reactor, a dissolved air flotation device for the purpose of at least partial deliming before the delivery into the anaerobic reactor or after the draining from the anaerobic reactor, with the water hardness being reduced by at least 5% in the dissolved air flotation device, wherein the dissolved air flotation device comprises a dissolved air flotation reactor and which is connected to the at least one drain line of the anaerobic reactor via a dissolved air flotation supply line such that at least a part flow of the purified waste water drained from the anaerobic reactor via the drain line can be guided into the dissolved air flotation reactor, wherein the dissolved air flotation device comprises:

at least one supply line for a pH setting medium; and a return line leading from the dissolved air flotation reactor directly or indirectly to the anaerobic reactor;

the apparatus further comprising a temperature setting device disposed in the return line.

25. An apparatus, for the purification of waste water, comprising:

at least one reactor for the anaerobic purification of waste water comprising at least one supply line for the delivery of waste water to be purified into the reactor as well as having at least one drain line for the draining of purified water from the reactor, a dissolved air flotation device for the purpose of at least partial deliming before the delivery into the anaerobic reactor or after the draining from the anaerobic reactor, with the water hardness being reduced by at least 5% in the dissolved air flotation device, wherein the dissolved air flotation device comprises a dissolved air flotation reactor and which is connected to the at least one drain line of the anaerobic reactor via a dissolved air flotation supply line such that at least a part flow of the purified waste water drained from the anaerobic reactor via the drain line can be guided into the dissolved air flotation reactor, wherein the dissolved air flotation device comprises:

at least one supply line for a pH setting medium; and a return line leading from the dissolved air flotation reactor directly or indirectly to the anaerobic reactor;

wherein the anaerobic reactor comprises a down line disposed concentrically around the longitudinal axis of the reactor.

\* \* \* \* \*